(12) United States Patent
Hosaka

(10) Patent No.: US 9,018,559 B2
(45) Date of Patent: Apr. 28, 2015

(54) AUTOMATIC WIRE THREADER FOR WIRE ELECTRIC DISCHARGE MACHINING APPARATUS

(75) Inventor: Akio Hosaka, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 375 days.

(21) Appl. No.: 13/643,077

(22) PCT Filed: Apr. 27, 2011

(86) PCT No.: PCT/JP2011/060333
§ 371 (c)(1),
(2), (4) Date: Oct. 23, 2012

(87) PCT Pub. No.: WO2011/136309
PCT Pub. Date: Nov. 3, 2011

(65) Prior Publication Data
US 2013/0037522 A1    Feb. 14, 2013

(30) Foreign Application Priority Data
Apr. 27, 2010  (JP) .................................. 2010-101936

(51) Int. Cl.
*B23H 7/10* (2006.01)

(52) U.S. Cl.
CPC ...................................... *B23H 7/102* (2013.01)

(58) Field of Classification Search
CPC .................................. B23H 7/10; B23H 7/102
See application file for complete search history.

(56) References Cited

U.S. PATENT DOCUMENTS

| | | | | | |
|---|---|---|---|---|---|
| 3,987,270 | A | * | 10/1976 | Ullmann et al. | 219/69.12 |
| 4,495,393 | A | * | 1/1985 | Janicke | 219/69.12 |
| 4,783,583 | A | * | 11/1988 | Obara et al. | 219/69.12 |
| 4,814,572 | A | * | 3/1989 | Aso et al. | 219/69.12 |
| 4,877,935 | A | * | 10/1989 | Aso et al. | 219/69.12 |
| 5,057,663 | A | * | 10/1991 | Kinoshita | 219/69.12 |

FOREIGN PATENT DOCUMENTS

| | | | | |
|---|---|---|---|---|
| EP | 2027961 | A2 | * | 2/2009 |
| JP | 4-093116 | A | * | 3/1992 |
| JP | 05-021693 | | | 1/1993 |
| JP | 5-301117 | A | * | 11/1993 |
| JP | 07-029246 | | | 1/1995 |
| JP | 2010-005719 | | | 1/2010 |
| JP | 2010-005719 | A | * | 1/2010 |

* cited by examiner

*Primary Examiner* — Geoffrey S Evans
(74) *Attorney, Agent, or Firm* — Jianq Chyun IP Office

(57) ABSTRACT

Provided is an automatic wire threader for a wire electric discharge machining apparatus including a jet nozzle (20). The jet nozzle includes a first finger and a second finger (21, 22) that are movable between their open positions where a jet nozzle hole (28) is undefined and their closed positions where the jet nozzle hole is defined. The jet nozzle further includes a compression coil spring (60) for urging the first finger and the second finger to their open positions. A moving device moves the jet nozzle from the retracted position to the operational position, so as to bring the first finger and the second finger in contact with a flush nozzle, thereby moving the first finger and the second finger against the a compression coil spring toward their closed positions.

5 Claims, 5 Drawing Sheets

AUTOMATIC WIRE THREADER FOR WIRE ELECTRIC DISCHARGE MACHINING APPARATUS

CROSS-REFERENCE TO RELATED APPLICATION

This application is a 371 of international application of PCT application serial no. PCT/JP2011/060333, filed on Apr. 27, 2011, which claims the priority benefit of Japan application no. 2010-101936, filed on Apr. 27, 2010. The entirety of each of the above-mentioned patent applications is hereby incorporated by reference herein and made a part of this specification.

TECHNICAL FIELD

The present invention relates to a wire electric discharge machining apparatus for generating electric discharge in a work gap formed between a work and a wire electrode running between a pair of wire guides, to machine the work. In particular, the present invention relates to an automatic wire threader for automatically threading a wire electrode through a pair of wire guides.

BACKGROUND ART

A typical wire electric discharge machining apparatus is equipped with an automatic wire threader. The automatic wire threader threads a wire electrode through an upper wire guide, a start hole, and a lower wire guide, in this order. The wire electrode threaded through the lower wire guide is delivered to a wind-up roller. The start hole has a diameter of approximately 1 mm, and is formed in the work before machining. The wire guide has a guide hole of 0.205 mm in diameter or 0.21 mm in diameter if the wire electrode to be used has a diameter of 0.20 mm. The upper and the lower wire guides are housed in their respective guide assemblies. Each guide assembly includes a flush nozzle for supplying work fluid to a work gap. The flush nozzle typically has an aperture of approximately 6 mm in diameter.

A current automatic wire threader includes a jet nozzle for generating a fluid jet (hereinafter referred to as a "jet") coaxially with a wire electrode. The jet urges the wire electrode to move to a lower wire guide under constraint. A typical jet nozzle has an aperture of 1.5 mm in diameter. The jet nozzle is usually disposed in an upper guide assembly for housing an upper wire guide.

The automatic wire threader described in Japan laid open publication No. H07-029246 includes a guide pipe movable vertically. A wire electrode can be threaded through the guide pipe and high pressure fluid is supplied to the guide pipe. A typical guide pipe has an outer diameter of 2 mm and an inner diameter of 1 mm. The guide pipe can easily approach a start hole, thereby enhancing the success rate of automatic wire threading. In most cases, a separable upper wire guide is used to thread a guide pipe therethrough. It is believed that such a separable wire guide has low durability and poor abrasion resistance.

The Japan laid open publication No. H05-021693 discloses a whirling arm whose one end is provided with a jet nozzle hole. The jet nozzle hole is movable between a retracted position and a lower portion of an upper guide assembly. The jet nozzle hole is located at the retracted position apart from the upper guide assembly during machining. One end of the whirling arm is fit in a lower portion of the upper guide assembly for the purpose of automatic wire threading. At this time, the jet nozzle hole is located immediately below a flush nozzle. The jet nozzle hole is separable so as to return to the retracted position. The jet nozzle hole is opened or closed by a pneumatic cylinder. Since the jet nozzle hole is provided outside the upper guide assembly, there is no limitation on designing of the upper guide assembly. In addition, no separable wire guide is necessary.

The Japan laid open publication No. 2010-005719 discloses an automatic wire threader having a jet nozzle hole provided outside an upper guide assembly, as similar to that of Japan laid open publication No. H05-021693. The jet nozzle set forth in the Japan laid open publication No. 2010-005719 is movable at higher speed between a retracted position and a lower portion of an upper guide assembly. The jet nozzle is separable on a plane including a central axis of the jet nozzle hole. The jet nozzle hole is opened or closed by a cylinder unit. The jet nozzle can be firmly coupled to a flush nozzle in a fluid-tight manner. The jet nozzle has a cylindrical portion perpendicularly extending downward. The cylindrical portion has a smaller outer diameter than that of the flush nozzle, so that the jet nozzle can approach a work more closely than the flush nozzle does.

SUMMARY OF INVENTION

Technical Problem to be Solved

Unfortunately, each of the automatic wire threaders disclosed in Japan laid open publication No. H05-021693 and No. 2010-005719 needs an actuator for opening and closing the jet nozzle hole. An object of the present invention is to improve an automatic wire threader including a jet nozzle hole provided outside an upper guide assembly. Taking account of placing a work in work fluid in most cases, the applicant does not adhere to fluid-tight coupling between a jet nozzle and a flush nozzle. Several advantages of the present invention will be described below.

Solution to Problem

The present invention relates to an automatic wire threader for a wire electric discharge machining apparatus, including a wire guide (31) having a guide hole for threading a wire electrode (2) therethrough; a flush nozzle (41) for injecting work fluid into a work gap formed between the wire electrode and a work (3); a jet nozzle (20) including a first finger (21) and a second finger (22), and having a jet nozzle hole (28); and a moving device (80) for moving the jet nozzle between a retracted position located apart from the flush nozzle and an operational position where the jet nozzle is in contact with the flush nozzle.

At least one of the first finger and the second finger is movable between an open position where the jet nozzle hole is undefined and a closed position where the jet nozzle hole is defined. In the automatic wire threader for a wire electric discharge machining apparatus, the jet nozzle includes bias means (60) for urging the at least one of the fingers toward the open position, and when the moving device moves the jet nozzle to the operational position, the at least one of the fingers is brought into contact with the flush nozzle and is thereby moved to the closed position against the bias means.

The bias means may be a compression coil spring for urging the at least one of the fingers toward the open position. It is preferred that, when the at least one of the fingers is located at the closed position, a cylindrical portion having the jet nozzle hole and perpendicularly extending toward the work is formed in the jet nozzle.

The automatic wire threader preferably further includes a guide nozzle (71) for guiding the wire electrode threaded through the upper wire guide into the jet nozzle hole. The guide nozzle has a nozzle hole (78) for threading the wire electrode therethrough, and the nozzle hole and the jet nozzle hole are coaxially aligned on a perpendicular line when the jet nozzle is located at the operational position.

Advantageous Effects of Invention

When the moving device moves the jet nozzle to the operational position, the at least one of the fingers is brought into contact with the flush nozzle and is thereby moved to the closed position against the bias means. Therefore, this configuration eliminates a special actuator for opening and closing the at least one of the fingers.

DESCRIPTION OF EMBODIMENT

Figure 1:
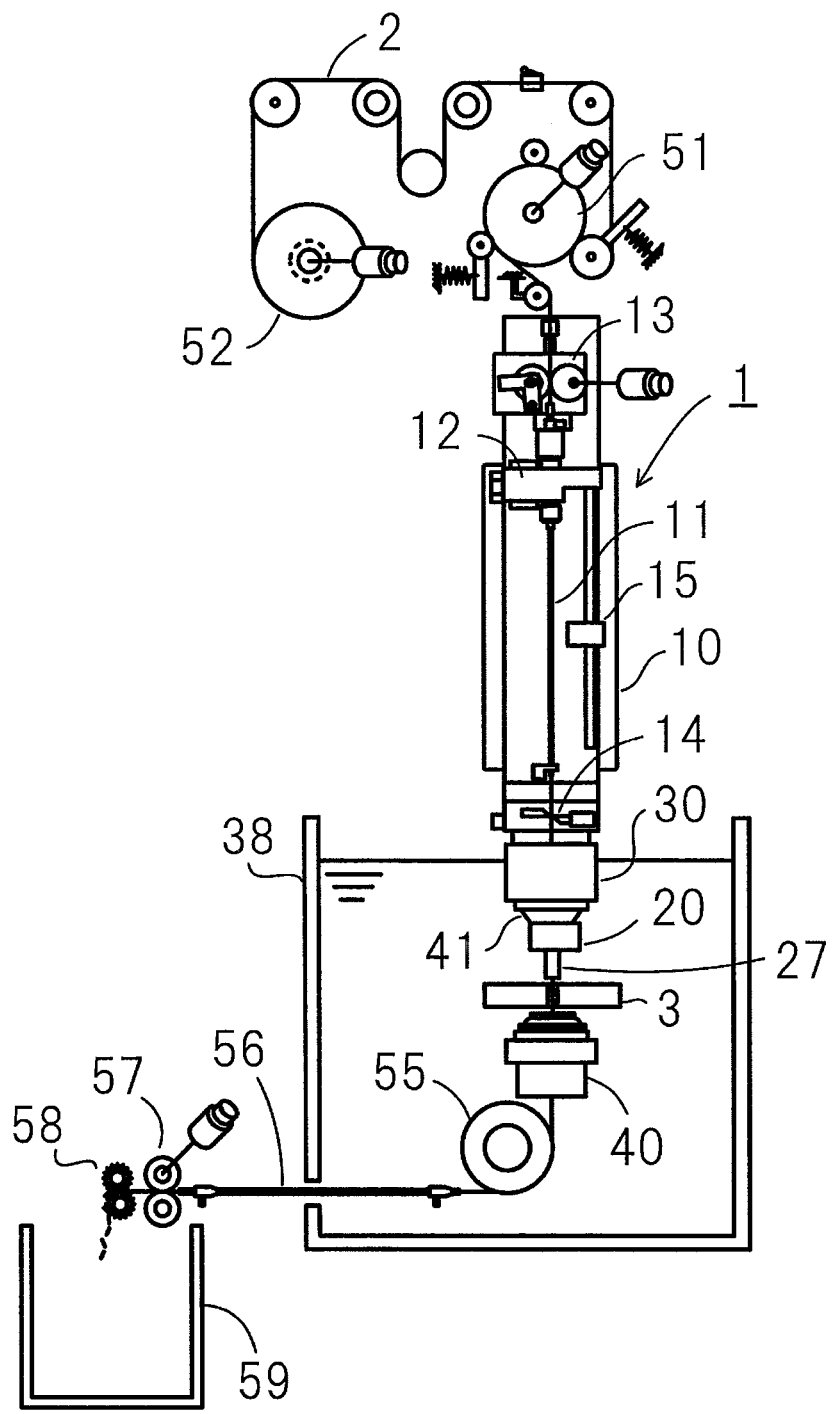
FIG. 1 is a schematic diagram illustrating a wire electric discharge machining apparatus equipped with an automatic wire threader according to the present invention.

FIG. 1 illustrates a wire delivery path of a wire electric discharge machining apparatus. A device for moving a jet nozzle is not depicted in this drawing. An automatic wire threader 1 includes a body 10, a guide pipe 11, a support block 12, a pair of feed rollers 13, a cutter 14, and a jet nozzle 20.

The guide pipe 11 is supported at its upper end by the support block 12. The support block 12 has a chamber therein. A high pressure fluid for guiding a wire electrode 2 is introduced into the chamber in the support block 12. The automatic wire threader 1 also includes a lifting device 15 for moving the guide pipe 11 in the vertical direction. The pair of the feed rollers 13 is provided for lowering or winding up the wire electrode 2. The pair of the feed rollers 13 is apart from each other during machining. The cutter 14 is provided for cutting off the wire electrode 2.

The body 10 of the automatic wire threader 1 is provided to a machining head (not shown) movable in the vertical axial direction. When the machining head is moved in the vertical axial direction, the body 10 is moved in the vertical direction. A device for moving the jet nozzle 20 is provided to the body 10. Guide assemblies 30, 40 are disposed vertically with a work 3 held therebetween. The upper guide assembly 30 houses an upper wire guide 31 supporting the wire electrode 2. The upper guide assembly 30 is fixed to a lower end of the body 10. Accordingly, the displacement of the machining head determines the height of the upper guide assembly 30.

The lower end of the guide pipe 11 is movable downward to a position immediately above the upper wire guide 31 by means of the lifting device 15. The guide pipe 11 guides the wire electrode 2 to a position immediately above the upper wire guide 41 during the automatic wire threading. At this time, the high pressure fluid is supplied from the chamber of the support block 12 into the guide pipe 11, thereby preventing the wire electrode 2 from being bent in the guide pipe 11. During machining, the lower end of the guide pipe 11 is located above the cutter 14.

The pair of the wire guides is disposed vertically with the work 3 held therebetween. The work 3 is placed in a work tank 38 and is fixed to an appropriate work stand. During machining, the wire electrode 2 under predetermined tension runs between the upper and lower wire guides. The pair of the wire guides positions the wire electrode 2 in the horizontal plane.

A flush nozzle 41 is provided for injecting work fluid into a work gap formed between the wire electrode 2 and the work 3. The work fluid washes away chips and cools the work gap. The lower guide assembly 40 is equipped with a flush nozzle having the same configuration as the flush nozzle 41. Typical work fluid may be water-based fluid having a high specific resistance. Oil-based work fluid is also known. The work tank 38 is filled with the work fluid and the work 3 being machined is placed in the work fluid.

The wire electrode 2 wound around a wire bobbin 52 is fed out by a tension roller 51. The tension roller 51 feeds out the wire electrode 2 toward the work 3 while applying tension to the wire electrode 2. The wire electrode 2 is then threaded by the automatic wire threader 1 through the upper wire guide, a start hole, and the lower wire guide, in this order. The start hole is perpendicularly formed in the work 3. The wire electric discharge machining starts from the start hole.

The wire electrode 2 threaded through the lower wire guide is led into an inlet of a delivery pipe 56 by a pulley 55. The high pressure fluid is supplied to the delivery pipe 56 by means of an aspirator, so that the wire electrode 2 is guided to a wind-up roller 57 by means of the fluid flow. The wire electrode 2 threaded through the wind-up roller 57 is cut into small pieces by a pair of cutting rollers 58. The small pieces from the wire electrode 2 are collected in a bucket 59.

Figure 2:
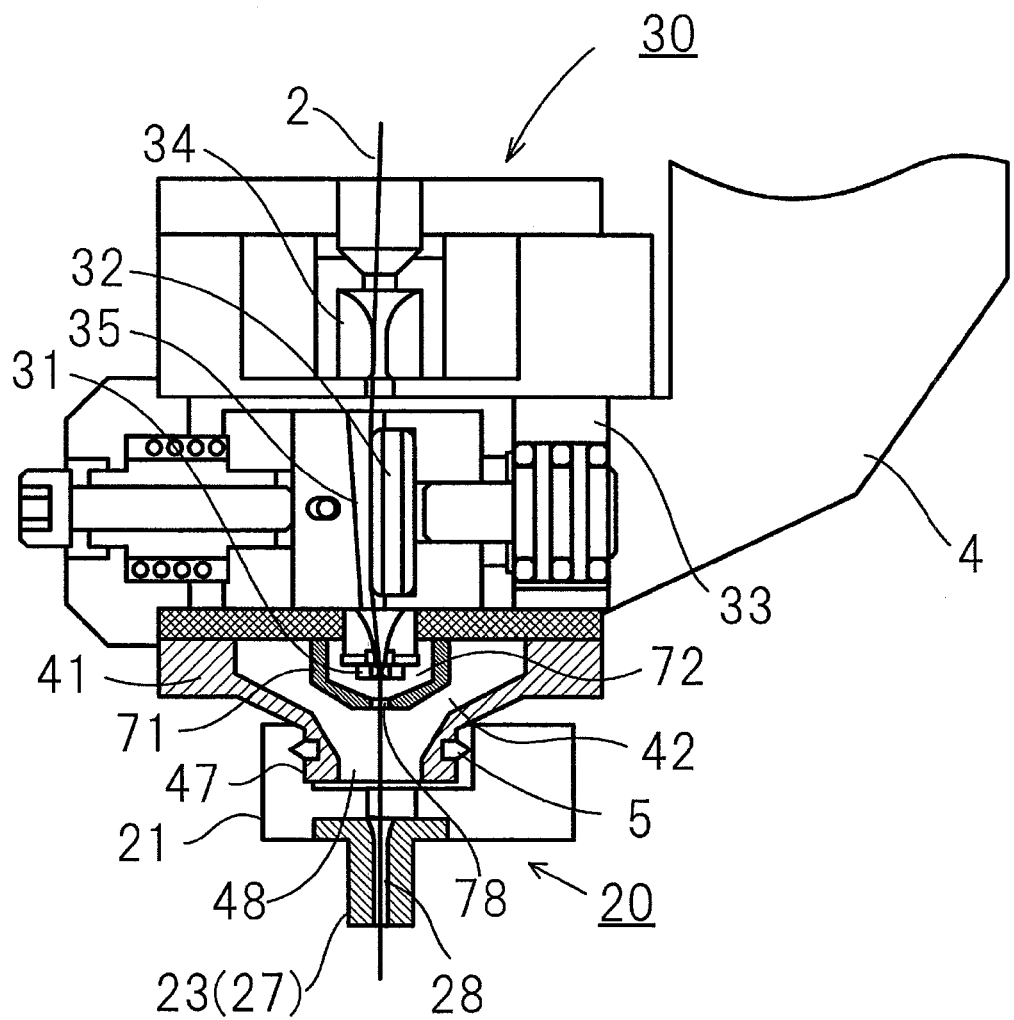
FIG. 2 is a right side cross-sectional view of an upper guide assembly in the automatic wire threader according to the present invention.

FIG. 2 illustrates the jet nozzle 20. The jet nozzle 20 is mounted to the flush nozzle 41 so as to cover an aperture 48. The device for moving the jet nozzle is not depicted in this drawing. The automatic wire threader 1 threads the wire electrode 2 through the start hole and the lower wire guide through a jet generated by the jet nozzle 20. The jet nozzle 20 has a jet nozzle hole 28.

The automatic wire threader 1 further includes a guide nozzle 71. The wire electrode 2 threaded through the upper wire guide 31 is guided into an inlet of the jet nozzle hole 28 by means of the fluid flow generated in the guide nozzle 71. The guide nozzle 71 has a nozzle hole 78 through which the wire electrode 2 is threaded. The nozzle hole 78 has a smaller diameter than that of the aperture 48 of the flush nozzle 41. The respective centers of the guide hole of the upper wire guide 31, the nozzle hole 78 and the jet nozzle hole 28 are aligned on a perpendicular line while the jet nozzle 20 is in contact with the flush nozzle 41. The nozzle hole 78 is directed to the inlet of the jet nozzle hole 28.

The upper guide assembly 30 is firmly fixed to an upper arm 4. The upper arm 4 is attached to the lower end of the body 10 of the automatic wire threader 1. The upper guide assembly 30 includes a housing 33 as the main component, and also includes the upper wire guide 31, a contact 32, a dummy guide 34, and the flush nozzle 41. The wire guide 31, the contact 32, and the dummy guide 34 are housed in the upper guide assembly 30. A portion of the wire guide 31 that comes in contact with the wire electrode 2 is made of diamond. The wire guide 31 is preferably located close to the work gap.

The contact 32 is provided for supplying power to the wire electrode 2. The contact 32 has a flat-plate shape and is made of cemented carbide. FIG. 2 illustrates the contact 32 pushed against the wire electrode 2. The contact 32 can be retracted from the wire delivery path by an actuator. The retraction of the contact 32 enables the lower end of the guide pipe 11 to move downward immediately above the wire guide 31. The dummy guide 34 guides the wire electrode 2 into the upper guide assembly 30.

The flush nozzle 41 threadedly engages the lower portion of the housing 33 so as to form the lower portion of the upper guide assembly 30. The flush nozzle 41 includes a cylindrical portion 47 perpendicularly extending downward. The aperture 48 directed toward the work 3 is formed at the lower end of the cylindrical portion 47. The aperture 48 has a diameter large enough to securely fill the work gap with the work fluid. The chamber 42 is formed by the flush nozzle 41 and the housing 33. The work fluid supplied to the chamber 42 is injected from the aperture 48 into the work gap.

The guide nozzle 71 is disposed at the lower portion of the housing 33 so as to be surrounded by the flush nozzle 41. A chamber 72 is formed by the guide nozzle 71 and the housing 33. The nozzle hole 78 is provided immediately below the guide hole of the wire guide 31, and the guide hole and the nozzle hole 78 are aligned on a single perpendicular line. The work fluid supplied to the chamber 72 is injected from the nozzle hole 78 into the start hole. The jet generated by the guide nozzle 71 urges the wire electrode 2 to perpendicularly move toward the start hole under constraint.

The jet nozzle 20 has the jet nozzle hole 28. While the jet nozzle 20 is being mounted to the flush nozzle 41, the fluid flow flushed from the guide nozzle 71 together with the wire electrode 2 reaches the inlet of the jet nozzle hole 28. The jet nozzle 20 constrains and guides the wire electrode 2 by means of the fluid flow supplied from the guide nozzle 71.

Figure 4:
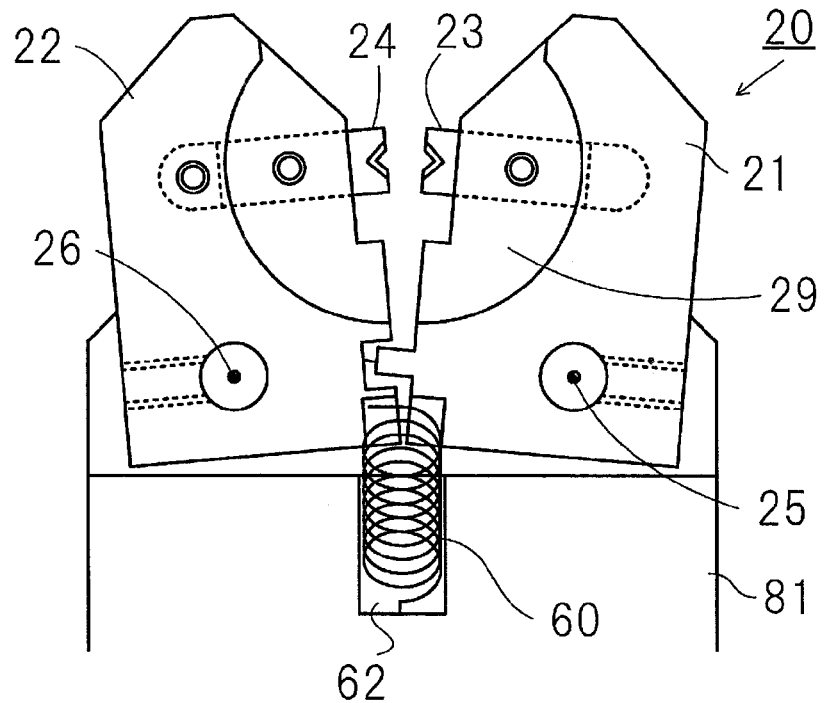
FIG. 4 is a plan view illustrating an example of the jet nozzle located at an open position.

The jet nozzle 20 is composed of two equal parts on a plane including the center of the jet nozzle hole 28. The jet nozzle 20 includes a pair of separate bodies that is regularly opened. The embodiment in FIG. 4 illustrates a first finger 21 and a second finger 22 that is the pair of the separate bodies. A first half-pipe member 23 is fixed to the bottom surface of the first finger 21. A second half-pipe member 24 is fixed to the bottom surface of the second finger 22. The first and the second half-pipe members 23, 24 come into tight contact with each other to form a cylindrical portion 27 perpendicularly extending toward the work 3.

Each of the first and the second half-pipe members 23, 24 has a V-shaped groove. The tight contact of the first and the second half-pipe members 23, 24 defines the jet nozzle hole 28 in a square pole shape inside the cylindrical portion 27. The jet injected from the jet nozzle hole 28 in a square pole shape has a substantially cylindrical shape. The jet nozzle hole 28 is formed in a square pole shape, so as to prevent the half-pipe members 23, 24 from catching the wire electrode 2 when the jet nozzle hole 28 is undefined. As shown in FIG. 2, the jet nozzle hole 28 has a funnel-shaped inlet.

The cylindrical portion 27 of the jet nozzle 20 has a smaller outer diameter than that of the cylindrical portion 47 of the flush nozzle 41. Accordingly, the jet nozzle 20 can approach the work 3 more closely than the flush nozzle 41 does. For example, a counter-bored hole is formed in the work 3, and the start hole is located in this counter-bored hole. Even in such a case, if the counter-bored hole has a diameter larger than the outer diameter of the cylindrical portion 27, the jet nozzle 20 can approach the upper surface of the work 3 closely.

Figure 3:
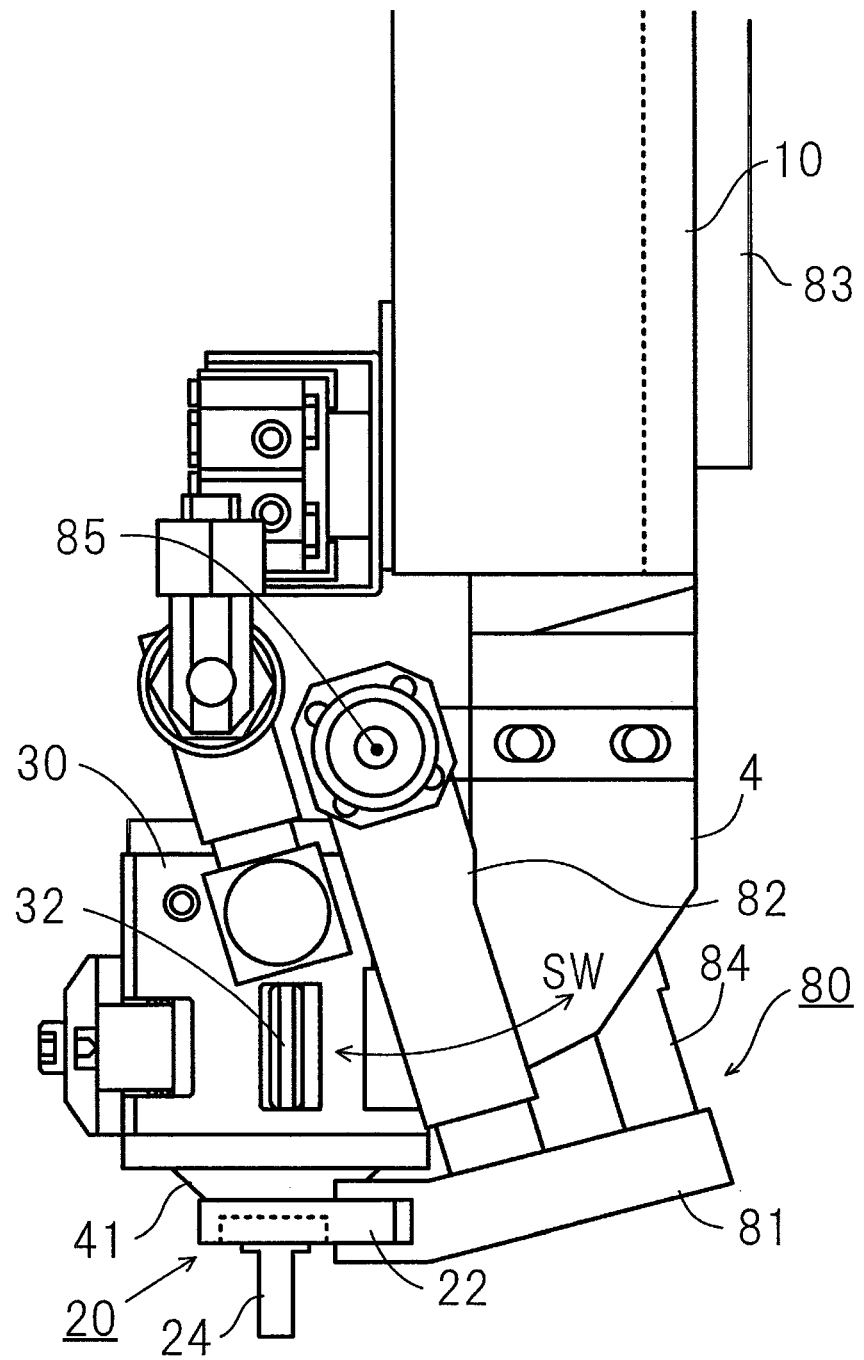
FIG. 3 is a right side view illustrating a jet nozzle and a moving device.

The jet nozzle 20 is usually placed in the work fluid, so that the jet nozzle hole 28 is barely opened. The work fluid leaked out from the jet nozzle hole 28 is scarcely splashed about its surroundings. Accordingly, the jet nozzle 20 does not require high fluid-tightness and high rigidity; hence, the jet nozzle 20 has a simple open-close mechanism. The jet nozzle 20 is movable between the retracted position and the operational position. The retracted position is located apart from the flush nozzle 41 and the work 3. In the present embodiment, the retracted position is located behind the lower end of the body 10. The operational position is a position where the jet nozzle 20 is in contact with the flush nozzle 41. FIGS. 1, 2, and 3 illustrate the jet nozzle 20 located at the operational position.

An annular projection 5 is formed around the outer periphery of the cylindrical portion 47 of the flush nozzle 41. When the annular projection 5 comes in contact with the jet nozzle 20 being moved to the operational position from the retracted position, the first and the second fingers 21, 22 are joined together.

The automatic wire threader 1 includes a moving device 80 for moving the jet nozzle 20 between the retracted position and the operational position. The moving device 80 includes a swing arm 81, a swing bracket 82, a cylinder unit 83 and a link mechanism 84. The jet nozzle 20 is held to one end of the swing arm 81. The link mechanism 84 is attached to the other end of the swing arm 81. The swing arm 81 is supported by the swing bracket 82. The swing bracket 82 can swing in the arrow direction SW around a fulcrum 85.

The cylinder unit 83 is operated by compressed air or pressurized oil. The cylinder unit 83 includes a cylinder, a piston, and a piston rod. The piston rod is joined to the link mechanism 84 partially illustrated. The motion of the piston to the lower limit lifts up the swing arm 81, thereby moving the jet nozzles 20 to the retracted position. The motion of the piston to the upper limit then pushes down the swing arm 81, thereby moving the jet nozzle 20 to the operational position. Only one stroke of the piston allows the motion of the jet nozzle 20 from the retracted position to the operational position.

Figure 5:
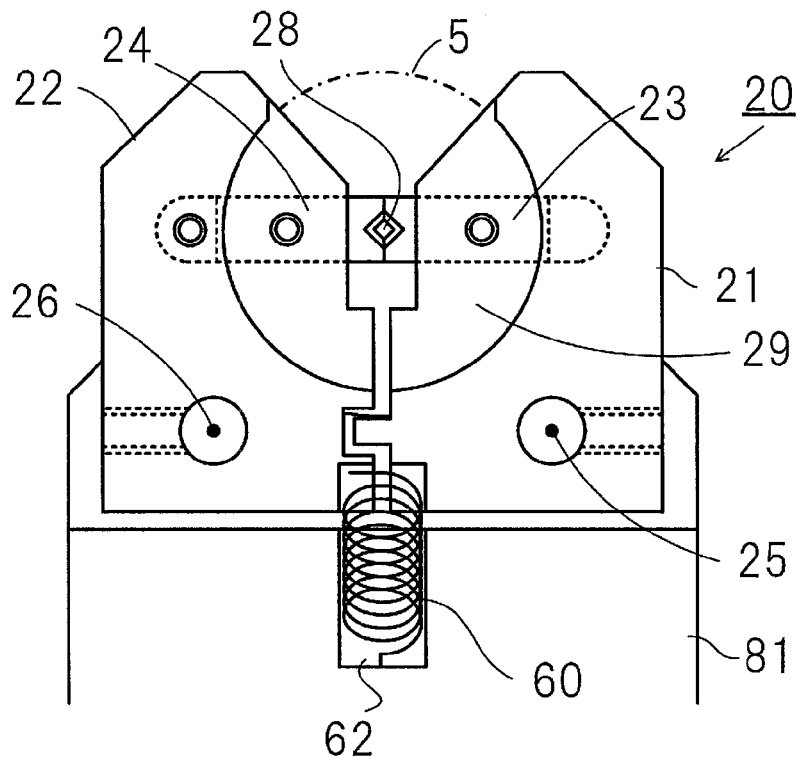
FIG. 5 is a plan view of the jet nozzle of FIG. 4 located at a closed position.

FIG. 4 illustrates the jet nozzle 20 when the first and the second fingers 21, 22 are located at their open positions. The open position is a position where the first and the second half-pipe members 23, 24 are apart from each other so that the jet nozzle hole 28 is undefined. The first finger 21 rotates around a fulcrum 25 so as to be movable between its open position and closed position. The second finger 22 rotates around a fulcrum 26 so as to be movable between its open position and closed position. The rotational direction of the second finger 22 is reverse to the rotational direction of the first finger 21. FIG. 5 illustrates the jet nozzle 20 when the first and the second fingers 21, 22 are located at their closed positions. The closed position is a position where the first and the second half-pipe members 23, 24 mutually contact so as to define the jet nozzle hole 28.

The jet nozzle 20 includes bias means for urging the first and the second fingers 21, 22 toward their open positions. The swing arm 81 and the first and the second fingers 21, 22 have recesses, respectively, and these recesses define a single spring chamber 62. The bias means is a compression coil spring 60 disposed in the spring chamber 62. The compression coil spring 60 is fixed at its one end to the swing arm 81. In FIGS. 3 and 4, the compression coil spring 60 urges the first and the second fingers 21, 22 upward.

A counter-bored hole 29 is formed at each inner edge of the first and the second fingers 21, 22. The counter-bored hole 29 has an opening that opens in the horizontal direction. The cylindrical portion 47 of the flush nozzle 41 can enter the counter-bored hole 29 from this opening. When the first and the second fingers 21, 22 are located at their closed positions, the annular projection 5 is fit in the counter-bored hole 29.

As the jet nozzle 20 approaches the operational position from the retracted position, the cylindrical portion 47 enters the counter-bored hole 29 in the substantially horizontal direction. The annular projection 5 then comes in contact with the inner periphery wall of the counter-bored hole 29. This contact of the annular projection 5 pushes the first and the second fingers 21, 22 in the direction reverse to the urging direction of the compression coil spring 60. Consequently, standing against the urging force of the compression coil spring 60, the annular projection 5 moves the first and the second fingers 21, 22 to their closed positions. In such a manner, the annular projection 5 is fit in the counter-bored hole 29, thereby mounting the jet nozzle 20 to the flush nozzle 41.

After the automatic wire threading is completed, the jet nozzle 20 is moved to the retracted position by the moving device 80. The annular projection 5 comes apart from the inner periphery wall of the counter-bored hole 29, and the first and the second fingers 21, 22 are moved to their open positions by the urging force of the compression coil spring 60. The first and the second fingers 21, 22 are movable between their open positions and their closed positions by means of a simple mechanism.

Figure 6:
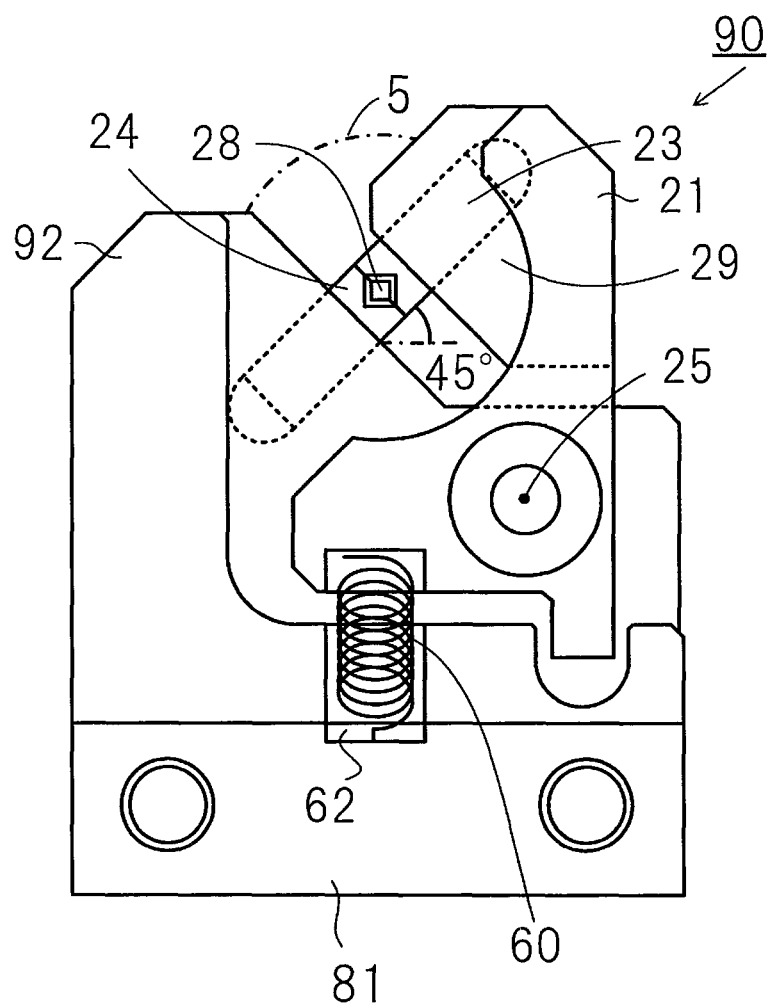
FIG. 6 is a plan view illustrating another example of the jet nozzle.

FIG. 6 illustrates a jet nozzle 90 including the first finger 21 and a second finger 92. The same elements as those of FIG. 5 are indicated by the same reference numerals, and the description thereof will be omitted. The second finger 92 is fixed to the swing arm 81. The half-pipe member 23 is attached to the bottom surface of the second finger 92. Only the first finger 21 rotates around the fulcrum 25 so as to be movable between its open position and its closed position. FIG. 6 illustrates the jet nozzle 90 when the movable finger 21 is located at its closed position.

The half-pipe members 23, 24 shown in FIG. 6 are disposed at an angle of 45 degrees from the position of those elements in FIG. 5. Accordingly, the second half-pipe member 24 is prevented from catching the wire electrode 2 when the jet nozzle 90 starts to move toward the retracted position.

What is claimed is:

1. An automatic wire threader for a wire electric discharge machining apparatus, comprising:
   a wire guide having a guide hole for threading a wire electrode therethrough;
   a flush nozzle for injecting work fluid into a work gap formed between the wire electrode and a work;
   a jet nozzle including a first finger and a second finger, the jet nozzle having a jet nozzle hole; and
   a moving device for moving the jet nozzle between a retracted position located apart from the flush nozzle and an operational position where the jet nozzle is in contact with the flush nozzle,
   wherein at least one of the first finger and the second finger is movable between an open position where the jet nozzle hole is undefined and a closed position where the jet nozzle hole is defined,
   wherein the jet nozzle includes bias means for urging the at least one of the fingers toward the open position,
   wherein when the moving device moves the jet nozzle to the operational position, the at least one of the fingers is brought into contact with the flush nozzle and is thereby moved to the closed position against the bias means.

2. The automatic wire threader for a wire electric discharge machining apparatus according to claim 1, wherein the bias means is a compression coil spring for urging the at least one of the fingers toward the open position.

3. The automatic wire threader for a wire electric discharge machining apparatus according to claim 1, wherein when the at least one of the fingers is located at the closed position, a cylindrical portion having the jet nozzle hole and vertically extending toward the work is formed in the jet nozzle.

4. The automatic wire threader for a wire electric discharge machining apparatus according to claim 1, wherein the automatic wire threader further comprises a guide nozzle for guiding the wire electrode threaded through the wire guide into the jet nozzle hole.

5. The automatic wire threader for a wire electric discharge machining apparatus according to claim 4, wherein the guide nozzle has a nozzle hole for threading the wire electrode therethrough, and the nozzle hole and the jet nozzle hole are coaxially aligned on a perpendicular line when the jet nozzle is located at the operational position.

* * * * *